(12) United States Patent
Sills et al.

(10) Patent No.: US 12,665,891 B2
(45) Date of Patent: Jun. 23, 2026

(54) MIGRATING CLIENT DEVICE FROM FIRST NETWORK TO SECOND NETWORK

(71) Applicant: Calix, Inc., San Jose, CA (US)

(72) Inventors: Daniel J. Sills, Moss Beach, CA (US); Krunal Patil, Apex, NC (US); Martin Casey, Dallas, TX (US)

(73) Assignee: Calix, Inc., San Jose, CA (US)

( * ) Notice: Subject to any disclaimer, the term of this patent is extended or adjusted under 35 U.S.C. 154(b) by 29 days.

(21) Appl. No.: 18/620,674

(22) Filed: Mar. 28, 2024

(65) Prior Publication Data

US 2025/0220009 A1 Jul. 3, 2025

Related U.S. Application Data

(60) Provisional application No. 63/616,100, filed on Dec. 29, 2023.

(51) Int. Cl.
*H04L 9/40* (2022.01)
(52) U.S. Cl.
CPC ............ *H04L 63/08* (2013.01); *H04L 63/108* (2013.01)
(58) Field of Classification Search
CPC ............................... H04L 63/08; H04L 63/108
See application file for complete search history.

(56) References Cited

U.S. PATENT DOCUMENTS

| | | | |
|---|---|---|---|
| 11,985,562 B2 | 5/2024 | Roberts et al. | |
| 2002/0032731 A1* | 3/2002 | Qian ..................... | G06F 16/954 |
| | | | 709/204 |
| 2016/0099931 A1* | 4/2016 | Nethi .................. | H04L 63/0815 |
| | | | 726/8 |
| 2017/0093828 A1* | 3/2017 | Lupien ................... | H04L 63/08 |
| 2018/0375861 A1* | 12/2018 | Isola ..................... | H04L 63/101 |
| 2020/0059787 A1* | 2/2020 | Whitaker ............ | H04L 63/0807 |
| 2024/0098600 A1 | 3/2024 | Roberts et al. | |

OTHER PUBLICATIONS

U.S. Appl. No. 18/148,734, filed Dec. 30, 2022, by Sills et al.
U.S. Appl. No. 18/148,747, filed Dec. 30, 2022, by Sills et al.
U.S. Appl. No. 18/535,682, filed Dec. 11, 2023, by Sills et al.
U.S. Appl. No. 18/617,304, filed Mar. 26, 2024, by Roberts et al.

* cited by examiner

*Primary Examiner* — Gil H. Lee
(74) *Attorney, Agent, or Firm* — Shumaker & Sieffert, P.A.

(57) ABSTRACT

A network system can include a memory and processing circuitry, in communication with the memory, configured to: grant a client device access to a first network; determine that the client device has received authentication credentials for a second network; in response to determining that the client device has received the authentication credentials for the second network, prevent the client device from reconnecting to the first network; and cause the client device to disconnect from the first network.

20 Claims, 3 Drawing Sheets

WEBSITE
120

ACCESS POINT MANAGEMENT SYSTEM
122

Wireless Network System
100

WAN
106

ACCESS POINT(S)
104

PROCESSING CIRCUITRY
108

MEMORY
110

COMMUNICATIONS CIRCUITRY
112

Network 1
105A

Network 2
105B

CLIENT DEVICE
102

MAC ADDRESS

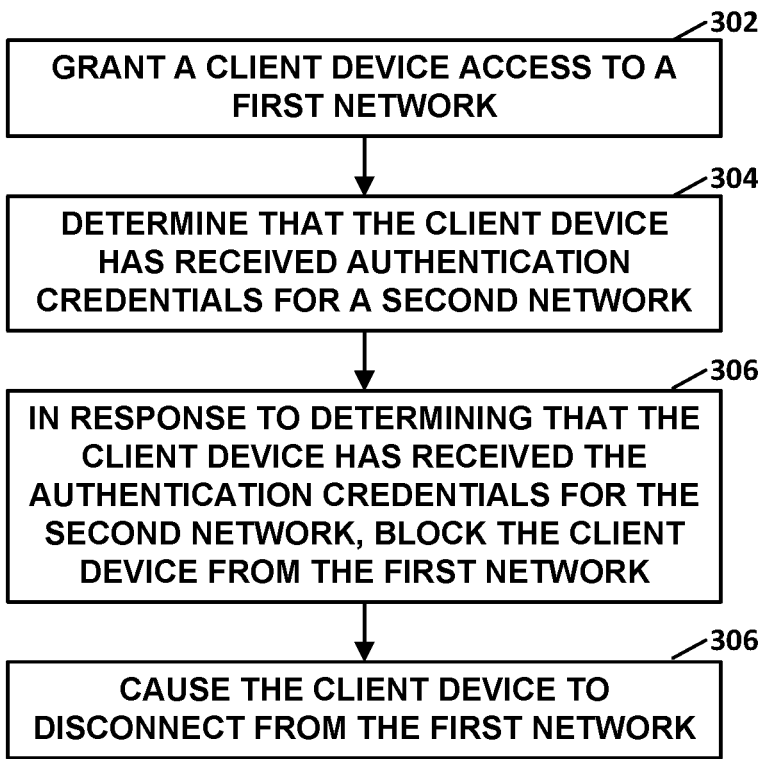

GRANT A CLIENT DEVICE ACCESS TO A
FIRST NETWORK ⟋302

DETERMINE THAT THE CLIENT DEVICE
HAS RECEIVED AUTHENTICATION
CREDENTIALS FOR A SECOND NETWORK ⟋304

IN RESPONSE TO DETERMINING THAT THE
CLIENT DEVICE HAS RECEIVED THE
AUTHENTICATION CREDENTIALS FOR THE
SECOND NETWORK, BLOCK THE CLIENT
DEVICE FROM THE FIRST NETWORK ⟋306

CAUSE THE CLIENT DEVICE TO
DISCONNECT FROM THE FIRST NETWORK ⟋306

FIG. 3

MIGRATING CLIENT DEVICE FROM FIRST NETWORK TO SECOND NETWORK

This application claims the benefit of U.S. Provisional Patent Application 63/616,100, filed 29 Dec. 2023, the entire content of which is incorporated herein by reference.

TECHNICAL FIELD

This disclosure relates to networking, and more particularly, communication between client devices and access points in a wireless network.

BACKGROUND

A wireless network, such as a wireless network configured for operation in accordance with the Wi-Fi protocols, includes access points and client devices. Client devices may connect to access points in order to access a Wide Area Network (WAN), such as the internet. In some examples, access points may be located with one or more Local Area Networks (LANs) that connect with the WAN. Service provider devices may provide services to the client devices via the WAN, one or more LANs, and the access points. In some examples, access points may be associated with one or more addresses (e.g., media access control (MAC) addresses), service provider information, and network information. One example of a Wi-Fi protocol is Passpoint®, which streamlines Wi-Fi access by facilitating an ability of user devices to find available networks.

BRIEF DESCRIPTION OF DRAWINGS

FIG. 3 is a flow diagram illustrating an example operation for using a first network to gain access to a second network, in accordance with one or more techniques of this disclosure.

DETAILED DESCRIPTION

Figure 1:
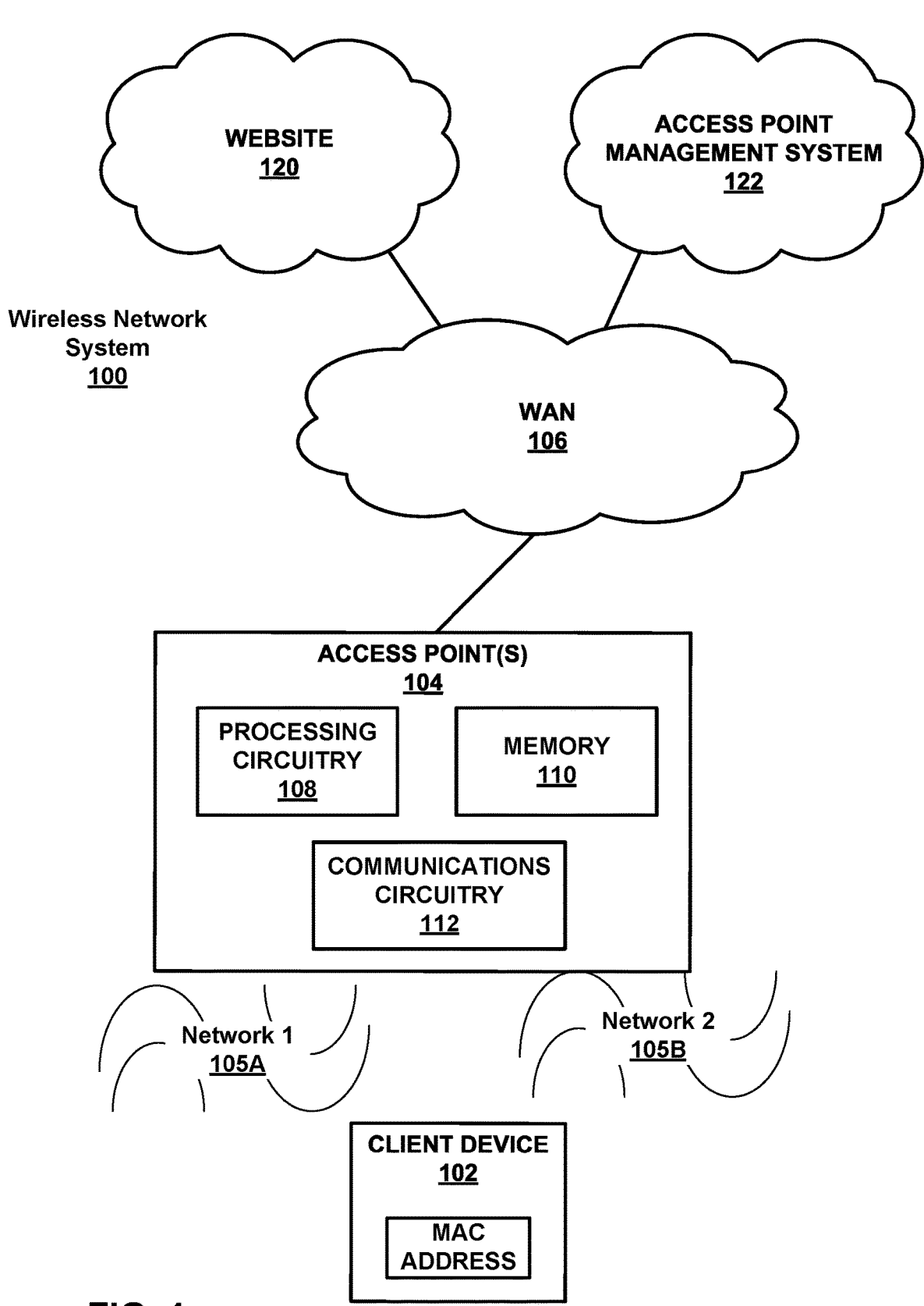
FIG. 1 is a block diagram illustrating an example wireless network system, in accordance with one or more techniques of this disclosure.

In general, this disclosure describes techniques for having a client device use a first network to gain authorization credentials for a second network. The first network may, for example, be an unrestricted, free wireless network, while the second network may be a restricted wireless network that requires authorization credentials. The second network may be a premium network that has increased speed, increased security, access to a wider variety of content, or other characteristics that make the second network preferrable to the first network.

The techniques of this disclosure generally relate to improving the user experience with respect to onboarding, where onboarding generally refers to the scenario where a user of a client device does not yet have the authorization credentials necessary to join the second network and, thus, may need to obtain those credentials via a different network before joining the second network. To obtain the necessary authorization credentials, the user of the client device may join the first, unrestricted network to obtain, e.g., download, the authorization credentials for the second network. After obtaining the authorization credentials, the user of the client device may then migrate to the second network.

Client devices, however, are typically configured to be "sticky" to networks that the devices have previously joined. That is, once a user connects the client device to the first network, the client device is going to attempt to stay connected to the first network and, if disconnected, attempt to reconnect to the first network. In order to force the client device to migrate to the second network, a user needs to manually override this default configuration of the client device, which can be aggravating for users, particularly unsophisticated users. In some cases, users may not even realize that they need to migrate to the second network and, thus, may stay connected to the first network even after obtaining the access credential for the second network.

In order to improve the user experience when onboarding a device to a restricted network, such as the second network described above, the techniques of this disclosure include configuring a network system to block, for a period of time, the client device from the first network in response to determining that the client device has received the authentication credentials for the second network and to cause the client device to disconnect from the first network. As used in this disclosure, blocking the client device from the first network merely means that the client device is prevented, for a period of time, from connecting or reconnecting to the first network. Blocking a device from a network does not necessarily include removing the device from the network if already connected. Blocking the device from the network, however, may prevent the device from the rejoining or reconnecting to the network once disconnected.

By blocking the client device from the first network, the client device is unable to reconnect to the first network once disconnected for the period of time where the client device is blocked. This blocking and disconnecting urges the user of the client device to migrate to the second network and makes such migration easier by not giving the client device the option to automatically reconnect to the first network. As will be described in detail below, in some implementations, the blocking and disconnecting may even prompt the client device to automatically migrate to the second network without any need for user intervention.

FIG. 1 is a block diagram illustrating an example wireless network system 100, in accordance with one or more techniques of this disclosure. Wireless network system 100 may be a multi-node channelized wireless network system, such as wireless network systems that operate in accordance with the Wi-Fi protocols. Wireless network system 100 may include wireless networks within a premise or area, such as a school, business, hotel, airport, stadium, etc.

Wireless network system 100 includes client device 102, access point(s) 104, wide area network (WAN) 106. Access point(s) 104 represent networking hardware devices that provide wireless connectivity to client device 102 via service provider networks. Client device 102 may be any type of subscriber device that can communicate wirelessly such as a computer, smartphone, smartwatch, tablet computing device, Internet-of-Things (IoT) device, and the like.

Access point(s) 104 may include one or more routers, extenders, repeaters, and the like. Access point management system 122 represents a cloud-based entity, such as one or more servers, that may be configured to manage some aspects of the operation of the devices that comprise access point(s) 104. Although shown as a cloud-based entity in FIG. 1, in some implementations, functionality attributed to access point management system 122 may be performed locally by access point(s) 104.

Although the techniques of this disclosure may be implemented by any type of access point, in some examples, access point(s) 104 may be Passpoint® access points. Passpoint® is a Wi-Fi protocol that facilitates client devices roaming between network hotspots. Passpoint® may allow client devices to discover hotspots, authenticate networks, provide encryption and security, and facilitate seamless roaming. Client devices may identify access points and shift from one access point to another as network conditions change to facilitate seamless roaming. Passpoint® may deliver seamless, secure Wi-Fi connectivity to any network employing the Passpoint® protocol. A connection mode according to the Passpoint® protocol may be different than the connection mode associated with other wireless networks or protocols. Some wireless networks and protocols use service side identifier (SSID) information to identify and/or distinguish different networks, or to determine whether a client device connects to the network. In general, networks using the Passpoint® protocol may use service provider identification information to distinguish networks. Regardless of whether an SSID corresponding to two different Passpoint® networks is the same, if service provider identification corresponding to the two different Passpoint® networks is the same, automatic access can be completed without any manual operation. Devices may use ANQP to obtain service provider identification information corresponding to one or more Passpoint® networks.

Each access point of access point(s) 104 includes processing circuitry 108, memory 110, and communications circuitry 112. Processing circuitry 108 and communications circuitry 112 may collectively be referred to as processing circuitry and may include fixed function circuitry and/or programmable processing circuitry. Processing circuitry 108 may include any one or more of a microprocessor, a controller, a digital signal processor (DSP), graphics processing unit (GPU), tensor processing unit (TPU), an application specific integrated circuit (ASIC), a field-programmable gate array (FPGA), or equivalent discrete or analog logic circuitry. In some examples, processing circuitry 108 may include multiple components, such as any combination of one or more microprocessors, one or more controllers, one or more DSPs, GPUs, TPUs, one or more ASICs, or one or more FPGAs, as well as other discrete or integrated logic circuitry, which may be physically located in one or more devices in one or more physical locations. Processing circuitry 108 may be capable of processing instructions stored in memory 110. In some examples, memory 110 includes a computer-readable medium that includes instructions that, when executed by processing circuitry 108, cause processing circuitry 108 to perform various functions attributed to them herein.

Communication circuitry 112 generally refers to the circuitry in access point(s) 104 that generates, transmits, receives, and processes carrier waves. Communication circuitry 112 may, for example, include antennas, modulation circuitry, demodulation circuitry, and other such circuitry. Communication circuitry 112 may, for example, be configured to transmit and receive carrier waves at 2.4 GHz, 5 GHz, or other such frequencies. Memory 110 may include any volatile, non-volatile, magnetic, optical, or electrical media, such as a random-access memory (RAM), read-only memory (ROM), non-volatile RAM (NVRAM), electrically erasable programmable ROM (EEPROM), ferroelectric RAM (FRAM), dynamic random-access memory (DRAM), flash memory, or any other digital media.

Various techniques of this disclosure may be described as being performed by processing circuitry. It should be understood that such processing circuitry may be contained on a single access point or may be distributed across multiple access points or other network devices.

Wireless network system 100 includes WAN 106, which may, for example, be the Internet. As illustrated in FIG. 1, access point(s) 104 provide client device 102 access to WAN 106 via first network 105A and second network 105B. First network 105A may, for example, have a different name, e.g., a different service set identifier (SSID), than second network 105B. The example of FIG. 1 shows WAN 106 in communication with website 120.

As will be explained in more detail below, access point(s) 104 may be configured to grant client device 102 access to first network 105A and, in response to determining that the client device has obtained authentication credentials for second network 105B, block client device 102 from first network 105A for a period of time. After blocking client device 102 from first network 105A, access point(s) 104 may cause client device 102 to disconnect from first network 105A. As client device 102 is blocked from first network 105A, client device 102 may be forced to migrate to second network 105B.

After the period of time has expired, access point(s) 104 may remove the blocking of client device 102. Thus, if the user of client device 102 did not complete the acquisition and installation of the authentication credentials needed to join second network 105B, then client device 102 will be permitted to rejoin first network 105A. If, however, client device 102 did join second network 105B, then going forward client device 102 may exhibit "sticky" behavior towards second network 105B instead of first network 105A.

Figure 2:
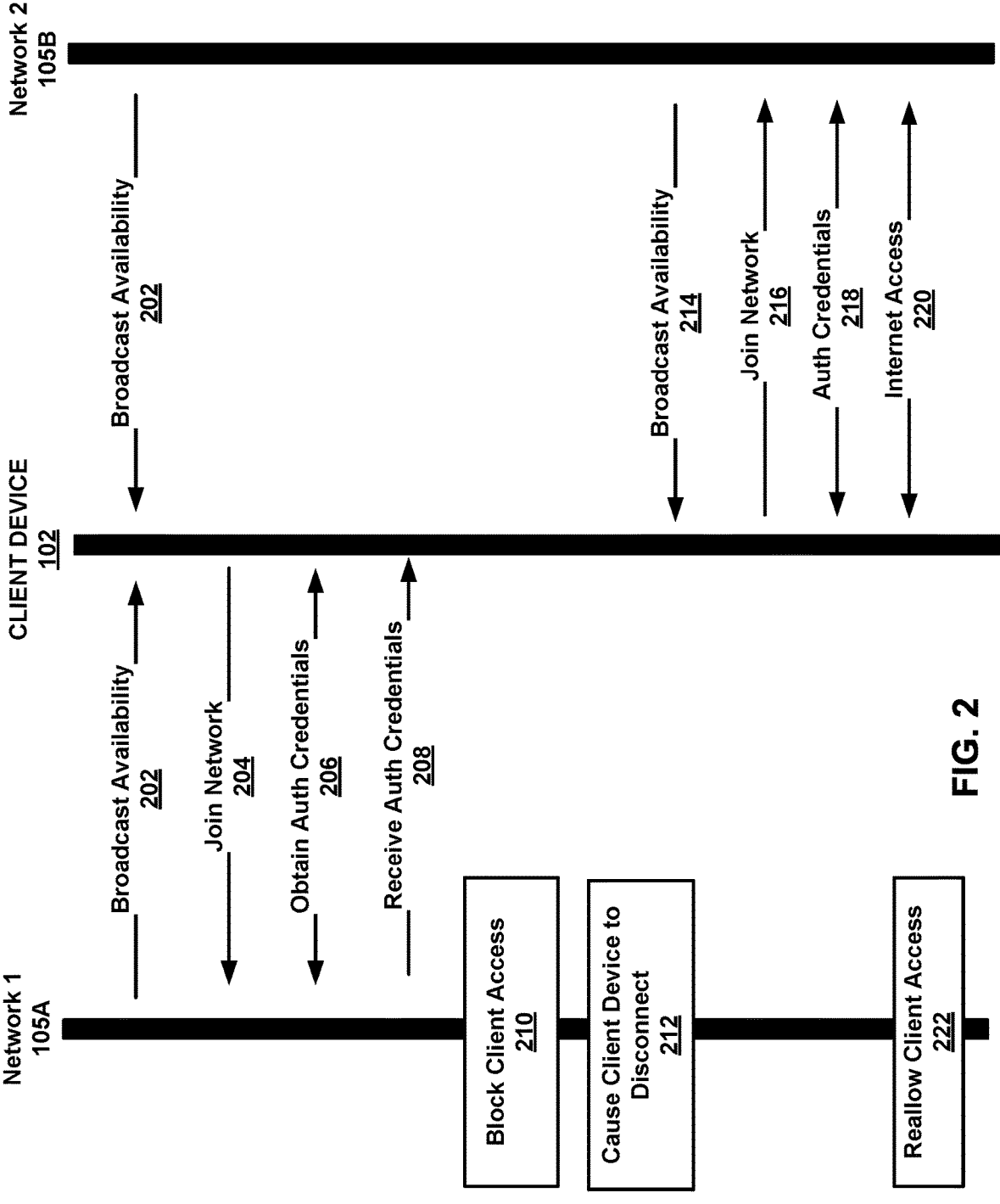
FIG. 2 is a flow diagram illustrating an example operation for using a first network to gain access to a second network, in accordance with one or more techniques of this disclosure.

FIG. 2 is a flow diagram illustrating an example operation for using a first network to gain access to a second network, in accordance with one or more techniques of this disclosure. The techniques of FIG. 2 will be described with respect to wireless network system 100 of FIG. 1.

In the example of FIG. 2, access point(s) 104 broadcast the availability of first network 105A and second network 105B (202). Thus, when a user of client device 102 looks to join a new Wi-Fi network, the user may see both first network 105A and second network 105B listed as available networks. In some examples, first network 105A may include terminology such as free, unrestricted, public, or the like in its network name in order to signal to users that first network 105A does not require any sort of pre-obtained authentication credentials to join, and similarly, second network 105B may include terminology such as restricted, private, or the like to indicate to users that second network 105B does require authentication credentials. In other examples, a user of client device 102 may be directed to join first network 105A in some other manner, such as by distribution or publication of instructions. Regardless of the specific technique used, a user of client device 102 may be directed to select first network 105A instead of second network 105B.

Client device 102 joins first network 105A (204) by, for example, the user selecting first network 105A from a list of available Wi-Fi networks in a settings page of client device 102. Upon joining first network 105A, access point(s) 104 may deliver, via a web browser for example, content to enable client device 102 to obtain the authorization credentials for second network 105B (206). Access point(s) 104 may, for example, redirect client device 102 to website 120 (FIG. 1) either automatically or by providing instructions to the user of client device 102. The user of client device 102 may then interact with website 120 to obtain the authorization credentials. Such interaction with website 120 may, for example, include providing payment information to website 120 to obtain the authorization credentials or providing login information to website 120 in order to prove that the user belongs to a group or organization that has access to second network 105B. The login information may, for example, prove that the user has an active subscription to a service that includes access to second network 105B. Although website 120 is shown in FIG. 1 as being accessible via WAN 106, in some implementations, website 120 may be hosted on a local area network accessible by access point(s) 104 or access point(s) 104 may act as a proxy server for website 120.

Using any of the various techniques described above, client device 102 receives the authorization credentials for second network 105B (208). The authorization credentials may include a username and password, an access code, a proof of payment, or any other such information needed to join second network 105B. In some examples, the user of client device 102 may need to manually enter the obtained authorization credentials in order for client device 102 to join second network 105B. In other examples, the authorization credentials may be a profile, e.g., a Passpoint® profile, that is downloaded to client device 102. A profile generally refers to a set of configuration data that defines connection parameters for a network. Such configuration data may include network names, security parameters, authentication methods, and other details that allow a device to automatically connect to the network. The installation of the profile may configure client device 102 to automatically find and connect to compatible and secured Wi-Fi networks, such as second network 105B, without the need to manually select the network or manually enter credentials.

Even after obtaining the authorization credentials, client device 102 may be "sticky" towards first network 105A. That is, despite having the authorization credentials for second network 105B, client device 102 may still be con-figured to prioritize remaining connected to, and reconnect-ing to, first network 105A over second network 105B because first network 105A is the network to which client device 102 most recently connected.

To facilitate the migration of client device 102 from first network 105A to second network 105B, access point(s) 104 may be configured to block client device 102 from first network 105A (210). Access point(s) 104 may block client device 102 from first network 105A by adding a MAC address of client device 102 or another device identifier of client device 102 to a blocked list or by removing the MAC address or other device identifier of client device 102 from an allowed list.

Access point(s) 104 may be configured to block client device 102 from first network 105A in response to deter-mining that client device 102 has obtained and/or installed the authorization credentials needed to join second network 105B. Access point(s) 104 may be configured to make the determination that client device 102 has obtained and/or installed the authorization credentials needed to join second network 105B in one or more of a wide variety of manners. For example, in some instances, website 120 may be con-figured to send a signal to access point management system 122 indicating that the authorization credentials have been delivered to client device 102. In other examples, website 120 may determine that client device 102 has received, or installed, the authorization credentials based on user feed-back, such as a confirmation, from a user of client device 102. Website 120 may then signal to access point management system 122 that the user has received or installed the authorization credentials and cause access point(s) 104 to block client device 102.

In other examples, access point(s) 104 may maintain an authorization timer and block client device 102 from first network 105A in response to the passage of a certain amount of time. The term authorization timer is not meant to connote any special functionality of the timer, but instead is merely meant to differentiate the timer from other timers described in this disclosure. The amount of time may, for example, be on the order of minutes, such as 10 to 20 minutes. In this implementation, access point(s) 104 make the determination that client device 102 has obtained and/or installed the authorization credentials needed to join second network 105B based on an assumption rather than actual confirma-tion. Such a technique may, however, have the benefit of enabling access point(s) 104 to make the determination locally without requiring information from other devices, such as website 120 or client device 102.

In some implementations, website 120 may also maintain an authorization timer instead of, or in addition to, access point(s) 104. Website 120 may signal to access point man-agement system 122 that the certain amount of time has passed, and in response, access point management system 120 may cause the access point(s) 104 to prevent client device 102 from connecting to first network 105A.

Some implementations of the techniques of this disclosure may utilize a combination of the techniques discussed above. For instance, access point(s) 104 may be configured to immediately block client device 102 from first network 105A in response to receiving a signal, e.g., via access point management system 122, from website 120 indicating that the user of client device 102 has received the authorization credentials for second network 105B, but in the absence of such confirmation, still block client device 102 from first network 105A in response to the passage of the certain amount of time.

After blocking client device 102 from first network 105A, access point(s) 104 may then cause client device 102 to disconnect from first network 105A (212). Once client device 102 is blocked and disconnected from first network 105A, client device 102 may stop receiving responses from access point(s) 104, which may cause client device 102 to start looking for alternative networks, such as network 105B.

In some implementations of the techniques of FIG. 2, after determining that client device 102 has received authen-tication credentials for a second network (208), access point(s) 104 may attempt to automatically reconfigure client device 102 to join second network 105B before blocking (210) client device 102 from first network 105A and causing client device 102 to disconnect (212) from first network 105A. Access point(s) 104 may, for example, send a mes-sage in accordance with IEEE 802.11v to direct or steer client device 102 to a new router or access point of access point(s) 104 that is associated with second network 105B. In some examples, access point(s) 104 may be configured to only block client device 102 from first network 105A and cause client device to disconnect from first network 105A in response to client device 102 not joining second network 105B after receiving the message.

While client device 102 is blocked from first network 105A, second network 105B may continue to broadcast availability (214). In some examples, such as cases where the authentication credentials are a Passpoint® profile, client device 102 may automatically find and connect to second network 105B without the need to select the network or manually enter any credentials. Even if client device 102 is not configured to automatically find and connect to second network 105B, being blocked and disconnected from first network 105A may serve as a prompt to the user of client device 102 to join a new network, at which point the user can connect client device 102 to second network 105B.

Client device 102 joins second network 105B (216), either automatically or manually, and provides the authorization credentials for second network 105B (218) either automatically or manually. Second network 105B then provides client device 102 access to WAN 106, e.g., the Internet (220).

After a period of time, access point(s) 104 may reallow client device 102 access to first network 105A (222). By this time though, client device 102 should now be connected to second network 105B, meaning client device 102 may now be "sticky" to second network 105B. Accordingly, client device 102 may now be configured to prioritize remaining connected to, and reconnecting to, second network 105B over first network 105A because second network 105B is the network to which client device 102 has most recently connected.

Should the user of client device 102 not have been able to properly obtain or install the authentication credentials before client device 102 was blocked and disconnected from first network 105A, then at this point, the user may be able to regain access to first network 105A to complete the process of obtaining the authorization credentials. The period of time for which client device 102 is blocked from first network 105A may, for example be on the order of 10s of second, such as 20 to 40 seconds, so that client device 102 has enough time to migrate from first network 105A to second network 105B, but not so long as to provide a poor user experience for those users who need to regain access to first network 105A to complete the process of obtaining the authorization credentials for second network 105B.

In a first, cloud based implementation of the techniques of this disclosure, client device 102 may connect to first network 105A, which may be an open/secure network named by a broadband service provider (BSP) for onboarding clients to second network 105B, also provided by the BSP. Access point(s) 104 sends this connection record to the cloud (e.g., access point management system 122), via an applicable messaging protocol, to be stored. The connection record may, for example, include the MAC address of client device 102 and the basic service set identifier (BSSID) MAC or some other identifier of the access point, as it could be possible to have multiple entries for the same MAC address on different access points if the user with client device 102 is moving around an area. Access point(s) 104 direct client device 102 to connect to website 120, which hosts the authorization credentials. Any variety of redirection techniques may be used, including automatic redirection via web browser, a redirect link in email or text message, a QR code, or any other such technique.

A user of client device 102 logs into website 120 and completes any required transactions necessary to be able to acquire the authorization credentials allowing connection to second network 105B. In response to client device 102 obtaining the authorization credentials, for example client device 102 downloading a profile from website 120 or a user of client device 102 confirming an install of a profile, website 120 signals to access point management system 122 the MAC address of client device 102, which has obtained the authorization credentials. Access point management system 122 matches the MAC address of client 102 with the associated access point. Access point management system 122 may then message one or more of access point(s) 104 with the MAC address of client 102, which has obtained the authorization credentials. A delay may be built in if needed to allow client 102 to receive other instructions, like how to install the profile.

Access point(s) 104 may then block and disconnect the MAC address received in the message from access point management system 122 from first network 105A for all radio bands. Access point(s) 104 may signal the disassociation from first network 105A to access point management system 122, so that access point management system 122 can remove the record of client device 102 from the list of known associations between clients and access points for all entries with the client MAC address.

In a second, local implementation of the techniques of this disclosure, client device 102 may connect to first network 105A, which is an open/secure network named by a BSP for onboarding clients to second network 105B. Access point(s) 104 direct client device 102 to connect to website 120, which hosts the authorization credentials, using any of the redirection techniques described above or comparable techniques. A user of client device 102 logs into website 120 and completes any required transactions necessary to be able to acquire the authorization credentials allowing connection to second network 105B.

When client device 102 obtains the authorization credentials, for example a profile is successfully downloaded or installed, as determined by an authorization timer and/or prompt, then website 120 may redirect, either via a button click or automatically, client device 102 to a local page hosted on access point(s) 104. When client device 102 loads this local page, the local page may automatically cause access point(s) 104 to block and disconnect client device 102 from first network 105A on all bands. In other examples, the local page may additionally or alternatively display information on how to install the profile and ask the user to click a button once the profile is installed, which may then cause the block and disconnecting.

In a third, web-based implementation of the techniques of this disclosure, client device 102 may connect to first network 105A, which is an open/secure network named by a BSP for onboarding clients to second network 105B. Access point(s) 104 direct client device 102 to connect to website 120, which hosts the authorization credentials, using any of the redirection techniques described above or comparable techniques. A user of client device 102 logs into website 120 and completes any required transactions necessary to be able to acquire the authorization credentials allowing connection to second network 105B.

While client device 102 is connected to website 120, access point(s) 104 establishes an https connection with website 120. When client device 102 obtains the authorization credentials, for example, a profile is successfully downloaded, as determined by an authorization timer and/or prompt, website 120 may send an https post command to signal to access point(s) 104 on the established session that client device 102 has obtained the authorization credentials to join second network 105B. Access point(s) 104 may then block and disconnect client device 102 from first network 105A on all radio bands.

In a fourth, timer-based implementation of the techniques of this disclosure, client device 102 may connect to first network 105A, which is an open/secure network named by a BSP for onboarding clients to second network 105B. Access point(s) 104 direct client device 102 to connect to website 120, which hosts the authorization credentials, using any of the redirection techniques described above or comparable techniques. Upon directing client device 102 to website 120, access point(s) 104 initiates an authorization timer. A user of client device 102 logs into website 120 and completes any required transactions necessary to be able to acquire the authorization credentials allowing connection to second network 105B. When the authorization timer expires, or equals or exceeds a certain value, the access point(s) 104 may then block and disconnect client device 102 from first network 105A on all radio bands.

For any of the four implementations described above, access point management system 122 may allow groups of access points deployed in the same geographic area to be placed in groups in the cloud, such that when one access point blocks client device 102, the access point may send a notification to access point management system 122, which then relays the blocked MAC address to all the access points in the same group as the access point that originated the blocking. In some examples, access point management system 122 may initiate the blocking by causing all access points in a group to block the MAC address.

In some examples, all the networks may have a unique name to negate the need to manage groups of access points by geographic area or network. For instance, a hashed value of an access point's MAC address may be appended to the named network to give all the networks a unique name.

The four example implementations provided above are not intended to be mutually exclusive. In fact, it is explicitly contemplated that the described techniques may be combined any variety of combinations and permutations.

FIG. 3 is a flow diagram illustrating an example operation for using a first network to gain access to a second network, in accordance with one or more techniques of this disclosure. The techniques of FIG. 3 will be described from the perspective of processing circuitry of a network system. The processing circuitry may, for example, be one or more instances of processing circuitry 108 and communications circuitry 112 described above. The processing circuitry may, for example, be on a single access point or distributed across multiple access points or other network devices.

In the example of FIG. 3, the processing circuitry grants a client device access to a first network (302). After granting the access, the processing circuitry may direct the client device, via the first network, to a website for obtaining the authentication credentials. A user of the client device may, for example, interact with the website by providing payment information, providing login credentials, providing proof of identity, agreeing to terms and conditions, and the like. The authentication credentials may include any one or more of a downloadable profile, an access code, a username and password, a proof of payment, or the like.

The processing circuitry determine that the client device has received authentication credentials for a second network (304). The first network may, for example, be a first wireless network with a first name or first SSID, and the second network may be a second wireless network with a second name or second SSID that is different than the first name or first SSID. The first network may be an unrestricted network, such that a user can use the first network to obtain authorization credentials for a second network that is inaccessible without those authorization credentials.

To determine that the client device has received the authentication credentials for the second network, the processing circuitry may initiate an authorization timer and determine that the client device has received the authentication credentials for the second network in response to the timer reaching a certain time. The timer may, for example, reach the certain time by counting up to a predetermined value or counting down from a predetermined value to zero. The processing circuitry may be configured to initiate the authorization timer in response to directing the client device to the website, granting the client device access to the first network, or some other such event.

In some examples, to determine that the client device has received the authentication credentials for the second network, the processing circuitry may be configured to receive an indication from the client device that the client device has received the authentication credentials, receive an indication from the website that the client device has received the authentication credentials, receive an indication from a cloud-based entity that the client device has received the authentication credentials, or receive an indication from a cloud-based entity. In some examples, the processing circuitry may do any combination or permutation of these techniques for determining that the client device has received the authentication credentials for the second network.

In response to determining that the client device has received the authentication credentials for the second network, the processing circuitry blocks the client device from the first network (306). To block the client device from the first network, the processing circuitry may, for example, be configured to determine a media access control (MAC) address of the client device and prevent the client device from joining the first network based on the MAC address of the client device. As part of blocking the client device from the first network, the processing circuitry may initiate a blocking timer and prevent the client device from rejoining the first network until the blocking timer reaches a certain value. The processing circuitry may then allow the client device to rejoin the first network after the blocking timer reaches a certain value.

The processing circuitry causes the client device to disconnect from the first network (308). In order to ensure that the client device does not immediately rejoin the first network, the processing circuitry may be configured to block the client device from the first network before causing the client device to disconnect from the first network. For example, the processing circuitry may add a device identifier (e.g., MAC address) of the client device to a blocked list or remove the device identifier from an allowed list before causing client device to disconnect from the first network.

After the processing circuitry has blocked and disconnected the client device from the first network, the client device may automatically, or manually by a user, join the second network using the obtained authorization credentials and obtain internet access over the second network. In some examples, after blocking and disconnecting the client device from the first network, the processing circuitry may automatically redirect the client device to the second network or present instructions to the user of the client device regarding how to join the second network.

In some implementations of the techniques of FIG. 3, after determining that the client device has received authentication credentials for a second network (304), the processing circuitry may attempt to automatically reconfigure the client device to join the second network before blocking the client device from the first network (306) and causing the client device to disconnect from the first network (308). The processing circuitry may, for example, send a message in accordance with IEEE 802.11v to direct or steer the client device to a new router or access point that is associated with the second network. In some examples, the processing circuitry may then only block the client device from the first network (306) and cause the client device to disconnect from the first network (308) in response to the steering not being successful or to not being able to confirm that the steering was successful.

The following describes example techniques in accordance with one or more examples described in this disclosure. The example techniques may be utilized together or separately.

Example 1. A network system comprising: a memory; and processing circuitry in communication with the memory, wherein the processing circuitry is configured to: grant a client device access to a first network; determine that the client device has received authentication credentials for a second network; in response to determining that the client device has received the authentication credentials for the second network, block the client device from the first network; and cause the client device to disconnect from the first network.

Example 2. The network system of claim 1, wherein to determine that the client device has received the authentication credentials for the second network, the processing circuitry is configured to: initiate an authorization timer; and determine that the client device has received the authentication credentials for the second network in response to the authorization timer reaching a certain time.

Example 3. The network system of claim 1 or 2, wherein to determine that the client device has received the authentication credentials for the second network, the processing circuitry is configured to: receive an indication from the client device that the client device has received the authentication credentials.

Example 4. The network system of any of claims 1-3, wherein the processing circuitry is further configured to: direct the client device, via the first network, to a website for obtaining the authentication credentials.

Example 5. The network system of claim 4, wherein to determine that the client device has received the authentication credentials for the second network, the processing circuitry is configured to: receive an indication from the website that the client device has received the authentication credentials.

Example 6. The network system of any of claims 1-5, wherein to block the client device from the first network, the processing circuitry is configured to: determine a media access control (MAC) address of the client device; and prevent the client device from joining the first network based on the MAC address of the client device.

Example 7. The network system of any of claims 1-6, wherein to block the client device from the first network, the processing circuitry is configured to: initiate a blocking timer; and prevent the client device from rejoining the first network until the blocking timer reaches a certain value.

Example 8. The network system of claim 7, wherein the processing circuitry further configured to: allow the client device to rejoin the first network after the blocking timer reaches the certain value.

Example 9. The network system of any of claims 1-8, wherein the authentication credentials comprise a profile to be installed on the client device.

Example 10. The network system of any of claims 1-9, wherein processing circuitry is further configured to: send a message to the client device to cause the client device to join the second network; and wherein the blocking of the client device from the first network and the causing of the client device to disconnect from the first network is in response to the client device not joining the second network after receiving the message.

Example 11. The network system of any of claims 1-10, wherein the processing circuitry is configured to block the client device from the first network before causing the client device to disconnect from the first network.

Example 12. The network system of any of claims 1-11, wherein the first network has a first service set identifier (SSID) and the second network has a second SSID that is different than the first SSID.

Example 13. The network system of any of claims 1-12, wherein the network system comprises a plurality of access points and the processing circuitry is distributed across the plurality of access points.

Example 14. A method comprising: granting a client device access to a first network; determining that the client device has received authentication credentials for a second network; in response to determining that the client device has received the authentication credentials for the second network, blocking the client device from the first network; and causing the client device to disconnect from the first network.

Example 15. The method of claim 14, wherein determining that the client device has received the authentication credentials for the second network comprises: initiating an authorization timer; and determining that the client device has received the authentication credentials for the second network in response to the timer reaching a certain time.

Example 16. The method of claim 14 or 15, wherein determining that the client device has received the authentication credentials for the second network comprises: receiving an indication from the client device that the client device has received the authentication credentials.

Example 17. The method of any of claims 14-16, further comprising: directing the client device, via the first network, to a website for obtaining the authentication credentials.

Example 18. The method of any of claims 14-17, wherein blocking the client device from the first network comprises: determining a media access control (MAC) address of the client device; and preventing the client device from joining the first network based on the MAC address of the client device.

Example 19. The method of any of claims 14-18, wherein blocking the client device from the first network comprises: initiating a blocking timer; and preventing the client device from rejoining the first network until the blocking timer reaches a certain value.

Example 20. The method of any of claims 14-19, wherein the authentication credentials comprise a profile to be installed on the client device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

Various examples have been described. These and other examples are within the scope of the following claims.

What is claimed is:

1. A network system comprising:
a memory; and
processing circuitry in communication with the memory, wherein the processing circuitry is configured to:
grant a client device access to a first network;
determine that the client device has received authentication credentials for a second network;
in response to determining that the client device has received the authentication credentials for the second network, prevent the client device from reconnecting to the first network after being disconnected from the first network; and
cause the client device to disconnect from the first network.

2. The network system of claim 1, wherein to determine that the client device has received the authentication credentials for the second network, the processing circuitry is configured to:
initiate an authorization timer; and
determine that the client device has received the authentication credentials for the second network in response to the authorization timer reaching a certain time.

3. The network system of claim 1, wherein:
to determine that the client device has received the authentication credentials for the second network, the processing circuitry is configured to receive an indication from the client device that the client device has been redirected to a website; and the processing circuitry is configured to prevent the client device from reconnecting to the first network in response to the client device loading the website.

4. The network system of claim 3, wherein the website is hosted by the processing circuitry.

5. The network system of claim 1, to determine that the client device has received the authentication credentials for the second network, the processing circuitry is configured to receive an indication from an access point management system, wherein the access point management system comprises one or more servers configured to manage one or more access points, wherein the one or more access points comprise the processing circuitry.

6. The network system of claim 1, wherein:
the processing circuitry is further configured to direct the client device, via the first network, to a website for obtaining the authentication credentials; and
wherein to determine that the client device has received the authentication credentials for the second network, the processing circuitry is configured to receive an indication from the website that the client device has received the authentication credentials.

7. The network system of claim 1, wherein to prevent the client device from reconnecting to the first network, the processing circuitry is configured to:
determine a media access control (MAC) address of the client device; and
prevent the client device from joining the first network based on the MAC address of the client device.

8. The network system of claim 1, wherein to prevent the client device from reconnecting to the first network, the processing circuitry is configured to:
initiate a blocking timer;
prevent the client device from rejoining the first network until the blocking timer reaches a certain value; and
allow the client device to rejoin the first network after the blocking timer reaches the certain value.

9. The network system of claim 1, wherein the authentication credentials comprise a profile to be installed on the client device.

10. The network system of claim 1, wherein processing circuitry is further configured to:
send a message to the client device to cause the client device to join the second network; and
prevent the client device from reconnecting to the first network and cause the client device to disconnect from the first network in response to the client device not joining the second network after receiving the message.

11. The network system of claim 1, wherein the processing circuitry is configured to prevent the client device from reconnecting to the first network before causing the client device to disconnect from the first network.

12. The network system of claim 1, wherein the first network has a first service set identifier (SSID) and the second network has a second SSID that is different than the first SSID.

13. The network system of claim 1, wherein the network system comprises a plurality of access points and the processing circuitry is distributed across the plurality of access points.

14. A method comprising:
granting a client device access to a first network;
determining that the client device has received authentication credentials for a second network;
in response to determining that the client device has received the authentication credentials for the second network, preventing the client device from reconnecting to the first network after being disconnected from the first network; and causing the client device to disconnect from the first network.

15. The method of claim 14, wherein determining that the client device has received the authentication credentials for the second network comprises:

initiating an authorization timer; and determining that the client device has received the authentication credentials for the second network in response to the timer reaching a certain time.

16. The method of claim 14, wherein determining that the client device has received the authentication credentials for the second network comprises receiving an indication from the client device that the client device has been redirected to a website; and the method further comprising preventing the client device from reconnecting to the first network in response to the client device loading the website.

17. The method of claim 14, further comprising directing the client device, via the first network, to a website for obtaining the authentication credentials; and wherein determining that the client device has received the authentication credentials for the second network comprises receiving an indication from the website that the client device has received the authentication credentials.

18. The method of claim 14, wherein preventing the client device from reconnecting to the first network comprises:

determining a media access control (MAC) address of the client device; and preventing the client device from joining the first network based on the MAC address of the client device.

19. The method of claim 14, wherein preventing the client device from reconnecting to the first network comprises:

initiating a blocking timer; and preventing the client device from rejoining the first network until the blocking timer reaches a certain value.

20. The method of claim 14, wherein the authentication credentials comprise a profile to be installed on the client device.

\* \* \* \* \*